United States Patent

La Russa

[15] 3,639,034
[45] Feb. 1, 1972

[54] OPTICAL PERSPECTIVE GENERATION SYSTEM

[72] Inventor: Joseph A. La Russa, Yonkers, N.Y.

[73] Assignee: Farrand Optical Co., Inc., New York, N.Y.

[22] Filed: Apr. 24, 1970

[21] Appl. No.: 31,716

[52] U.S. Cl. .............................. 350/31, 35/12 N, 350/50, 350/181, 350/202, 353/69, 355/52
[51] Int. Cl. .................................................. G02b 13/08
[58] Field of Search ............... 350/181, 174; 353/34, 35, 69, 353/70; 355/52; 35/12 N

[56] References Cited

UNITED STATES PATENTS

| | | | |
|---|---|---|---|
| 2,938,279 | 5/1960 | Hemstreet et al. | 350/181 UX |
| 3,237,194 | 2/1966 | Curry, Jr. et al. | 350/174 UX |
| 3,574,262 | 4/1971 | Bowker | 35/12 N |

*Primary Examiner*—John K. Corbin
*Attorney*—David E. Lovejoy

[57] ABSTRACT

An optical image generation system, for use in aircraft and other simulators, including two or more perspectiveless input objects each contributing a different component to a composite output image having perspective. The perspectiveless input objects, each to a different scale, are passed through a perspective generation system which is constructed in accordance with Scheimpflug principles. At least one of the component output images from the perspective generation system resulting from the input object is compressed, by an anamorphic lens system, before being combined to form the composite output image. The compression contributed by the anamorphic lens system in combination with the scale difference between the perspectiveless input objects and the power of the perspective generation system is such that the perspective generated in each component is the same. When those components are combined, therefore, into the composite output image, that composite output image has a single correct perspective.

19 Claims, 18 Drawing Figures

INVENTOR.
JOSEPH A. LaRUSSA

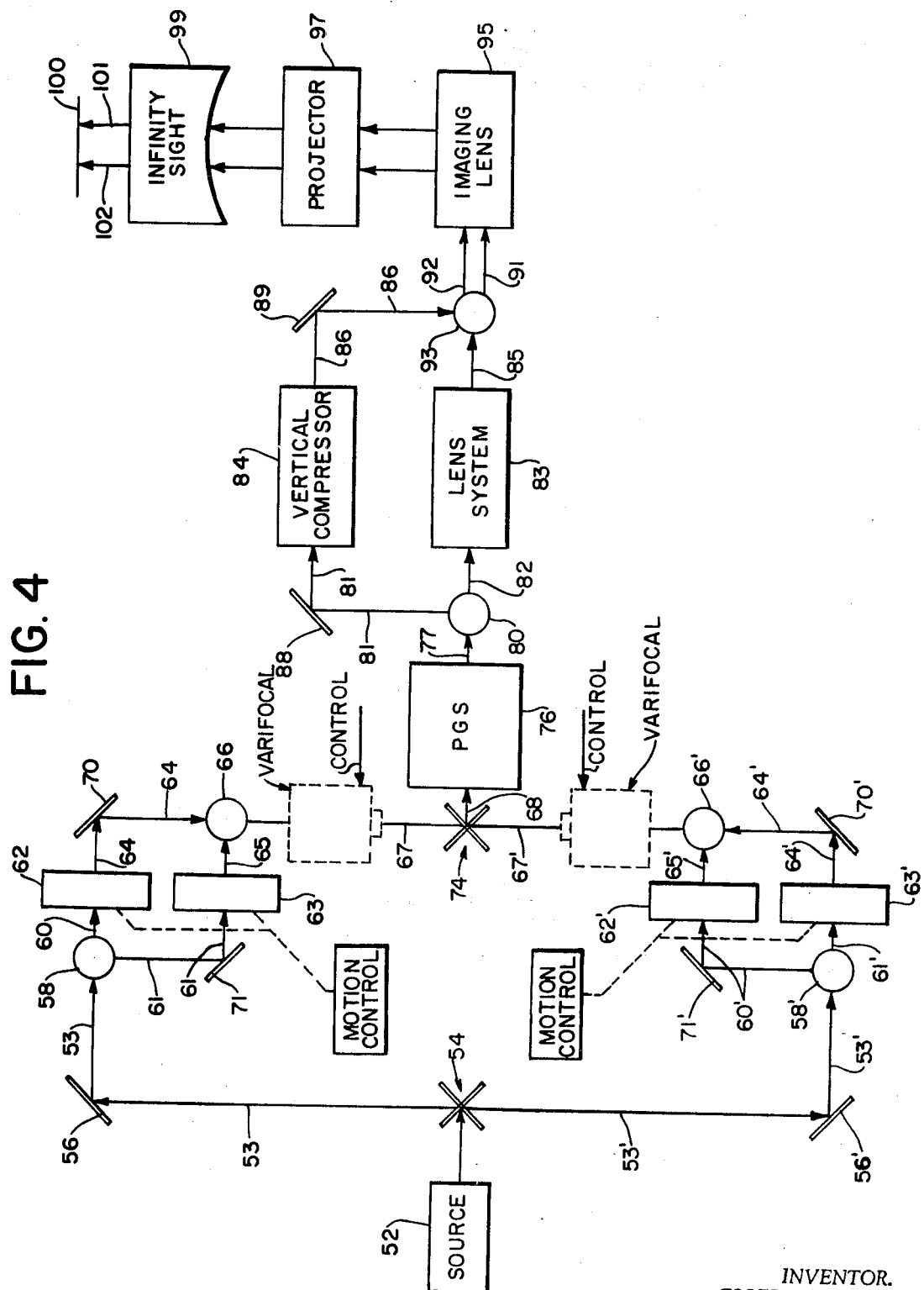

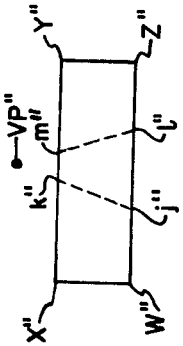
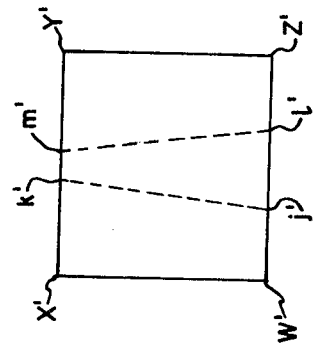
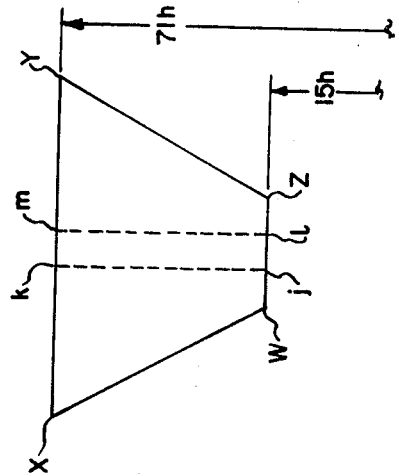
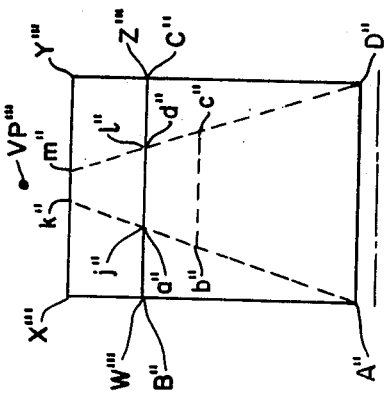
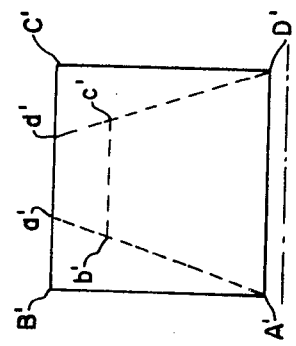
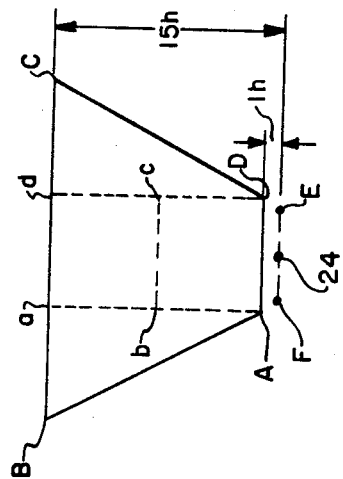
INVENTOR.
JOSEPH A. LaRUSSA INVENTOR.
JOSEPH A. LaRUSSA
BY
David E. Lovejoy
ATTORNEY

OPTICAL PERSPECTIVE GENERATION SYSTEM

BACKGROUND OF THE INVENTION

This invention relates to the field of image generation systems such as are frequently used in aircraft and other simulators. In such simulators, pilots or student pilots observe a simulated view of a flight path which is realistic to actual flight.

The simulated view is typically generated in part by a motion picture. The motion picture may be produced, for example, by cameras taking pictures from an aircraft flying a reference path similar to the path to be simulated. Since it is important for the student pilot to be able to simulate actual flight conditions, the simulator desirably displays realistic angular and translational variations in the fields of view as varied from the taking angle of the reference path photographs. Additionally, the simulated view desirably displays objects having both realistic perspective and realistic aspect.

Perspective is the phenomenon which causes rectangular objects to appear as trapezoidal objects. Stated another way, perspective is the phenomenon which causes lines which are parallel to appear to run to a vanishing point. When the observer's eyepoint changes in vertical, lateral or longitudinal translation or in any combination from the point of photography, then, of course, the perspective must also be changed.

Aspect is the phenomenon which identifies the viewing angle of objects. For example, the phenomenon of aspect makes a cube appear to have three sides when the viewing angle is looking toward one corner of the cube or makes a cube appear to have only one side when the viewing angle is normal to that side. Three-dimensional aspect exists when three sides of a cube or other solid object can be seen.

Motion picture film for use with simulators can be divided into two categories, namely, those which contain perspective and those which are perspectiveless. Basically, film exposed with an optical system pointed at a forward oblique angle, such as from an airplane with a camera pointed forward toward the horizon, contains perspective. Similarly, film exposed at the normal, such as by a camera in an airplane pointed directly beneath the airplane at a normal to the ground, is perspectiveless. Films exposed at a forward oblique angle, while normally containing perspective, can be rectified in order to remove the perspective by appropriately selecting the angle between object and image planes in a reprocessing system.

Cine motion film (a film having a plurality of frames) for use in simulators is generally exposed at a forward oblique angle and hence each of the frames in a cine motion film contains perspective. By way of contrast, strip film (a continuous film not having a plurality of frames) is generally exposed at a normal to the ground and in an analogous manner may be formed from a mosaic of photographs exposed at a forward oblique angle but which are thereafter rectified to remove the perspective. Strip film, therefore, is generally perspectiveless.

The two types of film, perspective film and perspectiveless film, have led to two types of simulators, namely, perspective alteration simulators and perspective generation simulators. On one hand, perspective generation simulators employ perspectiveless film (e.g., a continuous strip film) and generate the required perspective for the desired field-of-view angle where none before existed. On the other hand, perspective alteration systems (e.g., using cine motion film with perspective) alter the existing perspective already in the film to the perspective required for the desired field-of-view angle. Perspective alteration simulators typically employ the phenomena of "vertical compression" and "horizontal shear" to alter the existing perspective in a cine motion film.

Vertical compression is achieved in a well-known manner with an anamorphic lens system. An anamorphic lens system is one in which the component of magnification along one axis is different from the component of magnification along another axis. For example, a square object passed through an anamorphic lens which exhibits a smaller magnification along the vertical than along the horizontal becomes vertically compressed into a rectangle where the vertical sides are shorter than the horizontal sides. It should be noted that the phenomenon of vertical compression does not change the relationship between parallel lines. In vertical compression, lines parallel before compression are parallel after compression. On the other hand, angles between nonparallel lines are changed when vertical compression occurs.

The phenomenon of horizontal shear converts a rectangle to a nonright parallelogram. Horizontal shear converts a rectangle initially having vertical sides and horizontal sides to a parallelogram having inclined sides and horizontal sides. It should be noted also that shear does not alter the parallel relationship between parallel lines.

In order to alter perspective, the prior art cine motion film simulators require complex film production techniques coupled with complex film handling equipment. Cine film and therefore cine film simulators suffer severe restrictions on variations in velocity. These restrictions render it impossible to realistically simulate full stops. Full stops are necessities for simulation before and into takeoff, during and after landing and for hovering above the ground. Any stopping of a cine motion film, of course, subjects the film to high temperature usually resulting in burning. Furthermore, smooth accelerations from or decelerations to a stopped condition are practically impossible so attempts at stops with cine film create jumpingness in the simulated view. Besides the above problems, the cine film systems have suffered from a lack of resolution and accuracy while introducing geometric distortion errors. In view of the problems attendant cine film simulators, simulators have strip film image generation systems are preferred.

One prior art strip film image generation system suitable for use in simulators is described and claimed in the patent application entitled "Image-Forming Apparatus," invented by Joseph LaRussa, Ser. No. 544,866, filed Apr. 25, 1966, now Pat. No. 3,580,660, assigned to the same assignee as the present invention. Briefly, that invention relates to a system where one or more continuous strip films, representative of a desired field of view, are supported in position to be illuminated. Light from a selected portion of the film is projected through a perspective generating system for observation through an infinity sight. Provision is made to move the film with respect to the perspective generation system so that the field of view observed through the infinity sight may be changed. Motions imparted by the system appear to the observer as advance of the aircraft over the ground (forward or lateral), changes in aircraft heading, roll, pitch and altitude.

Strip film systems are particularly noted for their ability to come to a full stop. This full stop capability allows a simulated flight to commence from or terminate in a stopped condition, to accelerate and to decelerate smoothly, or to hover over the ground. The acceleration and deceleration is virtually variable from stopped to hypersonic speeds including the smooth transitions characteristic of actual flight.

The perspective generation system of the Ser. No. 544,866 invention generates perspective employing Scheimpflug condition principles. In general, without resort to the Scheimpflug condition, perspective may be generated with an optical system in which the object, in an object plane, is nonparallel to the image, in an image plane. In order for the image to be in focus when a lens system is employed between the object and image planes, however, the Scheimpflug condition generally must be satisfied. In a system where light from a transparency lying in a first plane (called the Scheimpflug object plane) passes through a lens system having a second plane (called the Scheimpflug lens plane), which Scheimpflug lens plane passes through the lens system's optical center at a normal to the lens system's optical axis, onto and forming an image on a third plane (called the Scheimpflug image plane), the Scheimpflug condition is met and therefore the image is in focus provided the three mentioned planes intersect in one common line.

The Ser. No. 544,866 system uses Scheimpflug principles when it accepts light from a perspectiveless strip film (the object) and generates an in-focus image having perspective using a perspective generation system constructed in accordance with the Scheimpflug condition.

In conclusion, prior art strip film simulators have eliminated most of the problems of cine motion systems. Particularly, prior art strip film systems such as the above Ser. No. 544,866 system have been simpler, more versatile, and have produced greater fidelity in the displayed image while admirably extending the angle of visibility to about 3° and 49' below the horizon. While that angle of visibility is generally more than adequate for simulation of ground effects or simulation of inflight effects, that angle is not fully adequate for takeoff and landing simulation. It is accordingly an object of the present invention to retain all of the benefits of strip film simulators while extending the angle of visibility so as to provide a simulator fully adequate for handling all simulation tasks including takeoff and landing.

SUMMARY OF THE INVENTION

In view of the above background of the invention, the present invention is an optical image generation system, and a simulator employing such a system. The image generation system accepts perspec,iveless objects, such as provided by strip films, and generates images having perspective.

More particularly, the present invention is an optical image generation system including two or more input objects each contributing a different component to a composite output image. The input objects, each to a different scale, are passed through a perspective generation system which is constructed in accordance with Scheimpflug principles. At least one of the images receives from the output of that perspective generation system is compressed, by an anamorphic lens system, before being combined with the others to form the composite output image. The compression contributed by the anamorphic lens system in combination with the scale difference between the input objects and the power of the perspective generation system is such that the perspective generated in each component is the same. When those components are combined, therefore, into the composite output image, that composite output image has a single correct perspective.

In accordance with one embodiment of the present invention, first and second objects are obtained from first and second strip films. The objects preferably include three-dimensional aspect but are essentially void of perspective.

A first one of the objects represents, at a first scale, a field of view subtended by a first angle, for example, commencing at about 45° below the horizon and running to an angle at about 3° 49' below the horizon. The other object represents, at a smaller second scale, a field of view subtended by a second angle, for example, commencing at about 3° and 49' and running to an angle at about 38' below the horizon. Stated another way, for an aircraft flying at an altitude $h$ above the ground, one object represents the field of view subtended by the distance measured from a projection point on the ground directly below the aircraft a distance commencing $1h$ out from the point to a distance $15h$ out from that point. The other object represents the field of view subtended by the distance $15$ out to $71h$. The $1h$, $15h$ and $71h$ values are, of course, arbitrary as any desired fields of view can be selected.

The first and second objects are each passed through a perspective generation system which, according to Scheimpflug principles, introduces perspective into the resulting first and second images. Thereafter, the image representative of the field of view from $15h$ to $71h$ is vertically compressed by an amount such that its perspective matches the perspective of the image representative of the field of view from $1h$ to $15h$.

After the vertical compression, the first and second images are combined into a composite image which when viewed, for example, through an infinity sight, provides a single field of view with perspective which is subtended by a distance from $1h$ to $71h$ for an observer at an altitude of $h$. Fields of view extending from $1h$ to $225h$ can be achieved with the present invention.

In one embodiment of the present invention, a single perspective generation system is timed shared to introduce perspective into both the first and second images. This time sharing is achieved by multiplexing the light derived from the first and second objects through the single perspective generation system and thereafter demultiplexing the light to form the first and second images with perspective. Thereafter, different vertical compression is introduced to each of the demultiplexed images to match perspective so that a composite field of view may be formed.

In accordance with another aspect of the present invention, a plurality of strip films representative of the field of view from $1h$ to $15h$ are arranged in parallel for cross-dissolving light from one to the other. In so doing, smooth transitions from one height to the other can be achieved. In a similar manner, a corresponding plurality of strip films representative of the field of view from $15h$ to $71h$ are also arranged in parallel with cross-dissolving apparatus. Each of the light paths in the parallel systems typically include a varifocal lens system for altering the magnification in each path. The varifocal lens systems allow smooth cross-dissolving between strip films of different scale. The differences in magnification and/or scale appear as differences in altitude in the simulated view.

In accordance with another aspect of the present invention, a strip film used as an input to the present system consists of a plurality of adjacently developed still photographs, with overlap, exhibiting a forward oblique taking angle. The photographs are taken at sequential points in a reference flight path. The still photographs are thereafter rectified and used to form the strip film. The rectification is carried out in one of several possible methods by exposing a strip film positioned at a normal angle above a diffusing screen with the still photographs projected onto the diffusing screen with an angle of incidence equal to the taking angle of the photographs. The strip film thus formed is perspectiveless while containing the three-dimensional aspect of solid objects.

The simulator apparatus in accordance with the above summary of the invention, achieves the objective of providing a strip film image generation system which, unlike the cine motion system has simple film production and handling capabilities along with high resolution and accuracy without introducing geometric distortion errors. Furthermore, the strip film system extends the heretofore achievement in the Ser. No. 544,866 invention of a field of view extending to approximately 3° and 49' below the horizon by providing a system which produces visibility out beyond 15' below the horizon.

Other objects, features, and advantages of the present invention will become more apparent in light of the following detailed description thereof, as illustrated in the drawings.

DESCRIPTION OF THE DRAWINGS

FIG. 4 depicts a block diagram of one preferred embodiment of the present invention.

FIGS. 5a, 5b, and 5c depicts the objects and component images which are developed as a first part of the apparatus of FIG. 4.

FIGS. 6a and 6b are representative of objects and component images which are developed as the second part of the apparatus of FIG. 4.

FIG. 7 is a representation of the composite output image developed by the apparatus of FIG. 4 from the component images of FIGS. 5 and 6.

DETAILED DESCRIPTION

General

Figure 1:
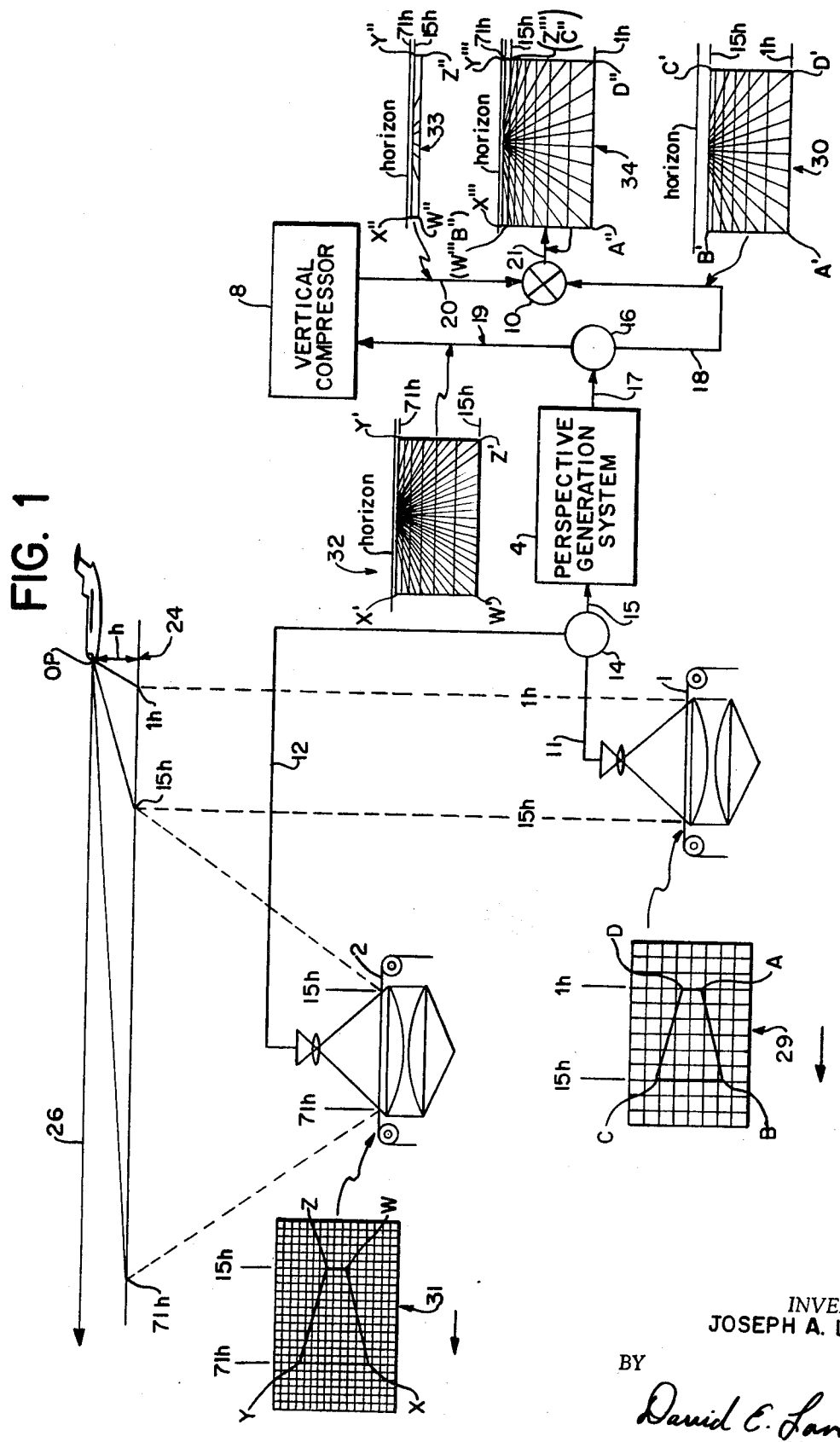
FIG. 1 depicts an overall block diagram of a simulator apparatus in accordance with the present invention.

In FIG. 1, an apparatus is shown for simulating the appearance of a total field of view on output light path 21 as derived from input strip films 1 and 2. In a typical embodiment of the present invention, the first strip film 1 contains a first perspectiveless object including a first partial field of view. Similarly, the second strip film 2 contains a second perspectiveless object including a second partial field of view. The prespectiveless objects from strip films 1 and 2 are conveyed over light paths 11 and 12 to a light chopper 14 which functions to time division multiplex on light path 15 the first and second objects alternately into the perspective generation system 4.

The perspective generation system 4 is a means for independently introducing perspective into the first and second objects. The perspective generation system 4 produces first and second component images which correspond to the first and second object inputs on light paths 11 and 12. The first and second component images appear in a multiplexed form on light path 17 in the same time relation as the inputs on paths 11 and 12 appear on path 15 and are time division multiplexed in chopper 16 on to light paths 18 and 19, respectively.

The vertical compressor 8 is a means for altering the perspective of the component image on light path 19 and functions to produce, on light path 20, a compressed component image which has perspective matching the perspective of the component image on light path 18.

Optical system 10 is a means for combining the component images on light paths 20 and 18 to form a composite output image on light path 21 which has a desired perspective.

Fields of View

Strip films 1 and 2 each contain objects which are perspectiveless representations of partial fields of a total field of view. Those partial fields of view are defined as the fields of view of an observer located at an observation point, OP, at a height, $h$ above the ground. Strip film 1 is representative of the partial field of view measured along the ground from the nadir point 24 out a distance commencing at $1h$ to a distance $15h$. Similarly, strip film 2 contains an object representing the partial field of view representative of the distance along the ground from $15h$ to $71h$.

The field of view on the strip film 1 is at a first scale as diagrammatically represented by the top view 29 of strip film 1. For a trapezoid designated ABCD the side AD lies along a line at a distance $1h$ and the side BC lies along a line at a distance $15h$. When the trapezoid ABCD is passed through the perspective generation system 4, the component image produced and appearing on light path 18, as represented by the view 30, is rectangular in shape with the side BC compressed to the same width as the side AD thereby forming the rectangle A'B'C'. Note that the lines parallel in the ABCD view include perspective in that they run toward a vanishing point in the view A'B'C'D'.

In a similar manner, the view 31 of strip film 2 has a trapezoid WXYZ which when conveyed along light path 12 to the perspective generation system 4 is converted to a rectangular component image W'X'Y'Z' and appears as such on light path 19. The parallel lines in the WXYZ trapezoid again have perspective in the W'X'Y'Z' trapezoid in that they run toward a common vanishing point.

The component image depicted by view 32 comprising the rectangle W'X'Y'Z' has its perspective further altered by the vertical compressor 8 as depicted by the rectangle W''X''Y''Z'' in view 33. The amount of compression in vertical compressor 8 is designed such that the perspective in view 33 for the rectangle W''X''Y''Z'' matches the perspective in the view 30 for rectangle A'B'C'D'.

With the perspective matched in this manner, the component images 30 and 33 are readily combined in optical system 10 to form the composite output image 34 comprised of the rectangle A''B''W'''X'''Y'''Z'''C''D''. The composite output image 34 has the desired perspective and that perspective has been generated by the apparatus of the present invention using two input perspectiveless strip film transparencies 1 and 2.

It should be noted that one of the advantages of this invention is that the perspective is obtained with all optical paths normal to the film and therefore the invention avoids illumination difficulties and optical design problems that would be encountered by observing the film at real angles. For example, to project a view up to within 48' of the horizon, the film would have to be viewed at an oblique angle of 89°12', an impossible situation for an optical system.

The partial fields of view described in FIG. 1 for the first and second objects derived from strip films 1 and 2 are defined with respect to the distances measured along the ground in terms of multiples of the height, $h$, of the observation point, OP, above the ground. Those partial fields of view may also be described in terms of the angle they subtend at the observation point. More particularly, the line from point OP to the $1h$ point on the ground is 45° below the horizon line 26. Similarly, the line from point OP to point $15h$ is 3°59' below the horizon so that the segment from $1h$ to $15h$ subtends an angle at the observation point of 41°1'. Additionally, the line from OP to $71h$ is 0°48' below the horizon so that the angle subtended at OP by the segment $15h$ to $71h$ is 3°11'. The second object is, therefore, defined as subtending an angle of 3°11' commencing where the first object terminates.

The distances $1h$, $15h$, and $71h$ have been selected for convenience in description. Those three values could be arbitrarily selected with many other magnitudes, for example, $1.7h$, $16h$ and $225h$.

Figure 2:
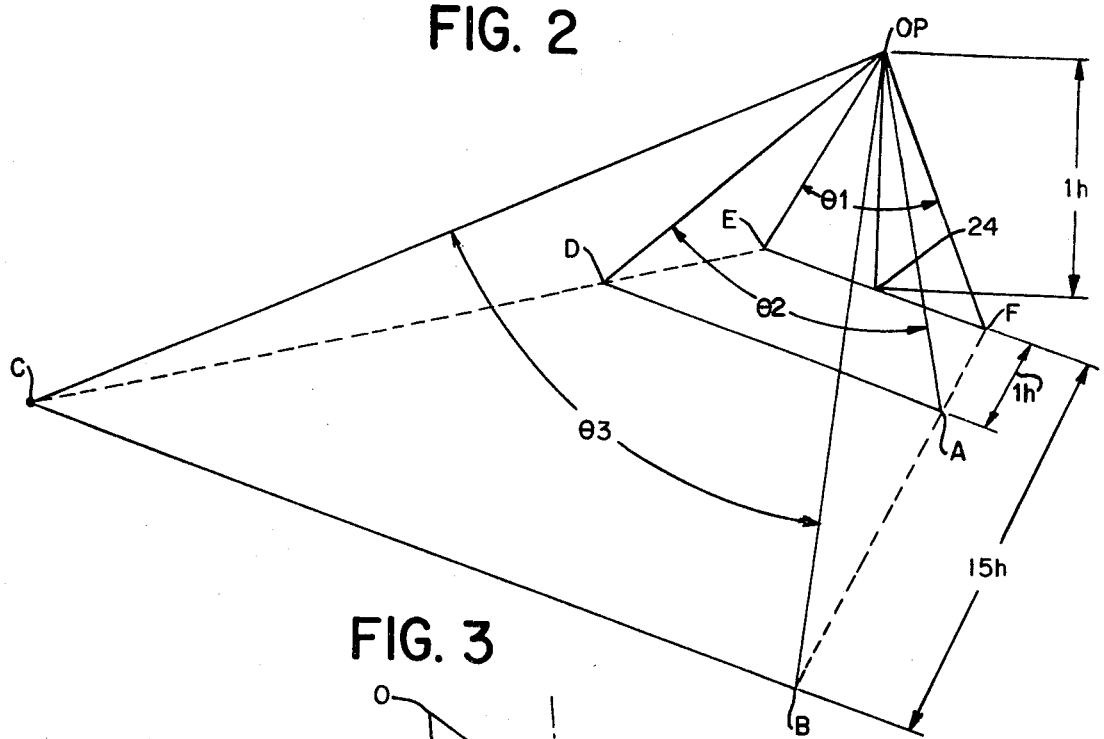
FIG. 2 depicts a representation of the angular fields of view from an observation point above the ground.

Referring to FIG. 2, the observation point, OP, at a height $1h$ above the ground is depicted with reference at the nadir point 24 on the ground. The first partial field of view is again, as in FIG 1, represented by a trapezoid ABCD. The nonparallel lines FAB and EDC define the lateral side of the patch to be transmitted via light path 11 to the perspective generation system 4 of FIG. 1. In FIG. 2, the angle $\theta1$ is subtended by the line EF, the angle $\theta2$ by the line DA and the angle $\theta3$ by the line CB. In order to produce a rectangular field of view in the composite output image, it is necessary in the perspective generation system 4 of FIG. 1 to alter the trapezoid ABCD such that $\theta1$ equals $\theta2$ equals $\theta3$. Similarly, the lines EF, DA and CB will be made equal. A rectangular field of view is not essential to the present invention and is selected merely for convenience in description.

While FIG. 2 is directed only to the trapezoid ABCD as derived from strip film 1 in FIG. 1, a similar conversion is also necessary for the trapezoid WXYZ derived from strip film 2 of FIG. 1. While it is not necessary that the composite output image have a rectangular shape such as occurs when $\theta2$ equals $\theta3$, it is necessary that the compression of $\theta3$ be greater than that of $\theta2$. Accordingly, any output shape may be obtained. Stated another way, $\theta2$ can be equal to, greater than, or less than $\theta3$ depending upon the amount of perspective introduced by the perspective generation system 4 of FIG. 1.

Scheimpflug Principles

The basic Scheimpflug principles for generating perspective employed in the perspective generation system of the present invention are disclosed and described in the above-identified U.S. Pat. application, Ser. No. 544,866 which is hereby incorporated by reference herein for the purpose of teaching those basic principles. By way of summarizing those principles and with reference to FIG. 3, perspective is added to an optical object (ABCD) lying in a first plane (HIML) by passing the object through a lens system (36), having a principal plane (HIJK) passing through its optical center (0) at a normal to the optical system's optical axis, so as to form an image (A1B1C1D1) in a third plane (HION) provided the three planes (HIML, HIJK, HION) intersect in a common line (HI).

Figure 3:
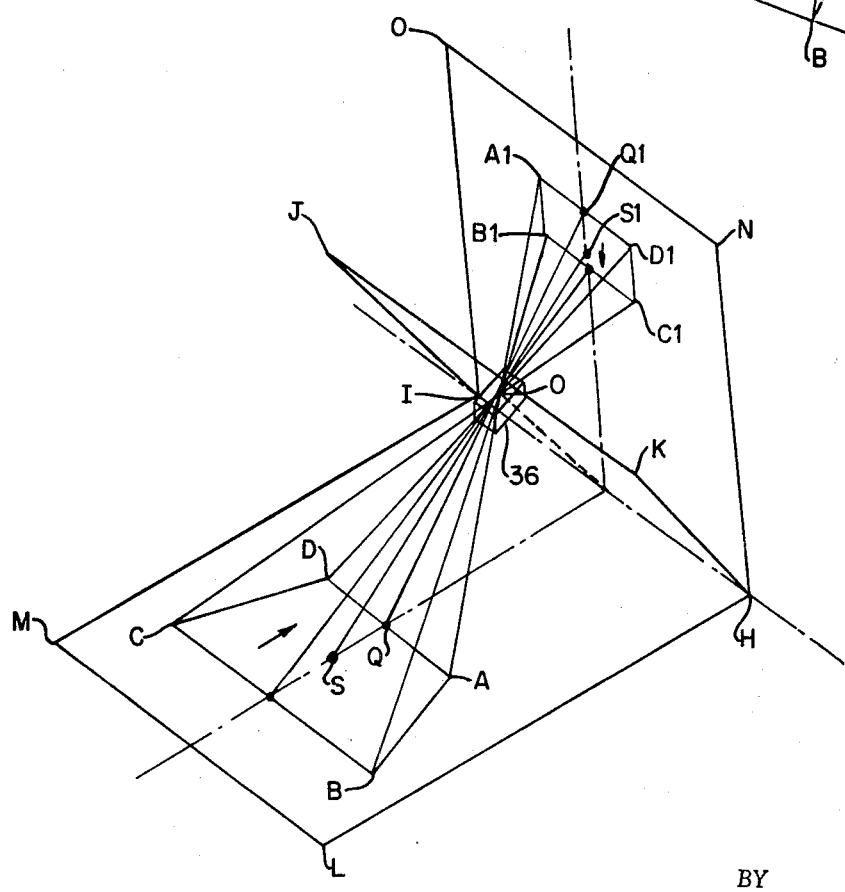
FIG. 3 depicts a lens system and three intersecting optical planes for illustrating the optical principles embodied in the present invention.

It is apparent in FIG. 3 that the trapezoidal object ABCD is transformed to a rectangular image A1B1C1D1. With this transformation, the plane HIML is called the first or Scheimpflug object plane, the plane HIJK is called the second or Scheimpflug lens plane, and the plane HION is called the third or Scheimpflug image plane. It is apparent that in accordance with Scheimpflug principles, as summarized with reference to FIG. 3, a perspectiveless object having parallel lines will be transformed to an image with perspective where the previously parallel lines become nonparallel and run toward a vanishing point.

Cross-Dissolve System

FIG. 4 depicts one preferred embodiment of the present invention. In FIG. 4, a first perspectiveless object is contained in a strip film positioned in strip film cassette 62. Typically, the strip film in cassette 62 is representative of the partial field of view from $1h$ to $15h$ like the trapezoid ABCD in FIG. 1. Similarly, strip film cassette 63 in FIG. 4 contains a second strip film typically containing a second perspectiveless object representative of the partial field of view from $15h$ to $71h$ like the trapezoid WXYZ in FIG. 1.

The apparatus of FIG. 4 further includes a second pair of film cassettes 62' and 63', analogous to cassettes 62 and 63, also representative of another pair of partial fields of view again from 1 to $15h$ and from $15h$ to $71h$, respectively.

A light source 52 is provided to transmit the perspectiveless objects from at least one of the film cassettes 62, 63, 62', 63' to the perspective generation system 76 along path 53, path 53', or both under control of conventional cross-dissolve mirrors 54.

Since the trapezoids from the film strips in cassettes 62–63' are minified and magnified in varying degrees to introduce proper perspective, the source 52 desirably provides a flux density which results in the output at 100 having uniform brightness. To achieve a uniform brightness, the illumination flux density gradient provided by source 52 through any local area of the strip film is made inversely proportional to the minification subsequently imposed on that local area by the remainder of the FIG. 4 system. A correct flux density gradient for a trapezoidal shape can be accomplished using conventional techniques.

In one technique, a neutral density filter is employed in source 52 and functions by absorbing or reflecting illumination in varying degrees so as to provide the desired gradient.

In another technique, lenses and/or aspheric reflectors are used to form the desired flux density gradient. For example, refractive elements such as two sets of anamorphosing elements reduce a uniform flux density rectangular input to a nonuniform trapezoidal flux density gradient which matches the minification which is applied to the trapezoidal strip film shapes. Alternatively, aspheric reflectors such as one or two partial parabolic reflectors having a source located off-aperture may be employed. Use of two such reflectors usually provides sufficient gradient but this combination, although generally acceptable, does not exactly produce a matching illumination flux density. A technique which achieves an exactly matching flux density employs a Scheimpflug perspective generation system between the illumination condensing system and the strip film.

Assuming for example that the cross-dissolve mirrors 54 are positioned so that the illumination from source 52 is directed along path 53, illumination is presented to one or the other of the strip film cassettes 62 or 63 via any required optical elements, such as conventional mirror 56, through light chopper 58. Light chopper 58 may be any conventional means for time multiplexing the light on path 53 to the paths 60 or 61. Light chopper 58 is typically a rotating disc having mirror sectors alternated with transparent sectors where the disc rotates in a plane approximately 45° to the input path 53. With this type of chopper 58, when the mirrored portion of the disc receives light from path 53, the light is deflected along path 61 to the cassette 63. When the transparent portion of the disc receives light from path 53, the light passes straight through to cassette 62 via path 60. The light from the cassette 62 appears on path 64 and similarly, the light from cassette 63 appears on path 65. The light paths 64 and 65 contain the first and second perspectiveless objects, respectively, and those objects are multiplexed onto path 67 by chopper 66 which is conventional like chopper 58 and is in synchronism with chopper 58. The multiplexed first and second objects on light path 67 are transmitted via cross-dissolve mirrors 74 and light path 68 to the perspective generation system (PGS) 76.

The perspective generation system 76 is an apparatus which functions in accordance with Scheimpflug principles which were previously described in connection with FIG. 3. In one embodiment of the present invention, the perspective generation system 76 may be like those described in the above-identified application, Ser. No. 544,866. A preferred embodiment of the perspective generation system 76 will be described hereinafter in further detail in connection with FIG. 8.

The outputs from system 76 appear as multiplexed component images on output light path 77, are demultiplexed by chopper 80 onto light paths 81 and 82. Chopper 80 is like the choppers 58 and 66 and in addition is in synchronism therewith. The component image appearing on path 82 corresponds to the object derived from the cassette 62 and the component image on light path 81 corresponds to the object derived from cassette 63. The component image on path 82 is relayed via lens system 83, which in one embodiment is a conventional relay lens, and output light path 85 to the chopper 93. Chopper 93 is like the choppers 58, 66, and 80, and is also in synchronism therewith.

The component image on path 81 from chopper 80 is vertically compressed in vertical compressor 84 in order to make the perspective for the component image on light path 86 match the perspective of the component image on light path 85.

The input light paths 85 and 86 to the chopper 93 are spacially adjusted such that the output paths 91 and 92 are side by side so as to form a composite output image. The composite output image schematically represented by light paths 91 and 92 passes through a conventional reimaging lens system 95 and is further conveyed to a conventional projector 97. The projector 97 projects the composite output image into an infinity sight 99 which in turn provides, for an observer at 100, a single composite view having one desired perspective. Although the component images in the composite output image presented schematically as light paths 101 and 102 are time division multiplexed, the frequency of multiplexing is sufficiently high so that the observer does not detect any flicker.

While the above description of FIG. 4 has been given with reference to the light paths from the cross-dissolve mirror assembly 54 which runs along light path 53 to light path 67 and cross-dissolve mirror 74, there is a similar path from light path 53' to 67' and mirror assembly 54. In operation, either or both pairs of cassettes 62 and 63 or cassettes 62' and 63' are employed. For example, when a transfer is occurring from the upper pair of cassettes 62 and 63 to of the lower pair of cassettes 62' and 63', all four cassettes may be simultaneously employed. Typically, the intensity of light along light path 53 is reduced while the light intensity on light path 53' is increased, or vice versa. Such cross-dissolving, implemented with crossddissolve system 54 and 74, is typically employed when the strip films in the cassettes 62 and 63 are nearing their end and it is desired to continue the simulation for the observer at 100. With cross-dissolving, a smooth transfer without interruption may be achieved by transferring from one pair of cassettes to another. Such a cross-dissolving technique is shown and described in the above-identified application, Ser. No. 544,866.

In addition to the apparatus of FIG. 4, many of the light paths, such as paths 53 and 53', typically include varifocal lens systems which are useful in changing the apparent altitude of the simulated flight as observed by the observer at 100. Cross-dissolving from one pair of cassettes to another may also be employed for simulated changes in altitude.

In FIG. 1, the trapezoids WXYZ and ABCD are the "patches" obtained from strip film 1 and strip film 2. Of course, shapes other than trapezoidal may be employed. It should be noted that the trapezoids are smaller in dimension than the strip films in FIG. 1 so that the trapezoids may be selected from different areas of the films. For purposes of reference, the direction of travel of the strip films is indicated by the heavy black arrows adjacent the views 29 and 31. Vertical movement of the patches with respect to the arrows typically appears to the observer at 100 as a lateral translation of the aircraft with respect to the ground. Rotation of the patches with respect to the direction of the arrows in FIG. 1 appears as a change in heading of the aircraft.

Operation of System

Referring to FIGS. 5 and 6, further details as to the objects and component images formed by the perspective generation system like that employed in FIG. 4 are described. In FIG. 6a, the first object in the form of trapezoid ABCD is shown. That trapezoid is analogous to the trapezoid ABCD shown in both FIG. 1 and FIG. 2. More particularly, the line EF not within the trapezoid ABCD passes through the nadir point 24. The base line of the trapezoid AD is represented at a distance of $1h$ from the nadir point and, similarly, the line BC is represented at a distance of $15h$ from the nadir point. For purposes of explaining the operation of the perspective generation system, the trapezoidal patch ABCD includes the parallel lines A$a$ and D$d$. Bisecting the lines A$a$, D$d$, is the line $bc$.

The object of FIG. 6a is representative of the object presented on the light path 64 of FIG. 4. That object is conveyed via light chopper 66 and cross-dissolve mirror 74 and light path 68 to the perspective generation system 76 from which the component image of FIG. 6b appears as one of the multiplexed images on light path 77. It is apparent from observing the component image of FIG. 6b that the lines A$a$ and D$d$ which were parallel in FIG. 6a appear to run to the vanishing point, VP. More particularly, the lines A'$a'$ and the line D'$d'$ appear to run to the vanishing point VP. Note also that the bisecting line $b'c'$ is considerably closer to the $15h$ line B'C' in FIG. 6b than the corresponding position in FIG. 6a.

In a manner analogous to the generation of perspective in FIG. 6a as shown in FIG. 6b, perspective is introduced into the object of FIG. 5a as depicted in FIG. 5b. More particularly, the object of FIG. 5a is representative of the object appearing on light path 65 in the apparatus of FIG. 4. Similarly, the trapezoid WXYZ of FIG. 5a is like the trapezoid WXYZ of FIG. 1 obtained from strip film 2.

In FIG. 5a, the trapezoid WXYZ includes two parallel lines $jk$ and $lm$. The line $jk$ is in reality an extension of the line A$a$ from FIG. 6b and the $lm$ is an extension of the line D$d$ also of FIG. 6a. The spacing between the lines in FIG. 5a is less than the spacing between the lines in FIG. 6a because the two strip films from which the trapezoidal objects are obtained have different scales. In the example chosen for FIGS. 5 and 6, the difference in scale is three to one. The line $jl$ typically represents a distance on the ground. With the difference in scale, the line $ad$ represents the identical distance on the ground.

The object depicted in FIG. 5a is representative of the object appearing on light path 65 in FIG. 4. That object is conveyed by the light chopper 66 and light paths 67 and 68 to the perspective generation system 76 where perspective is added thereto. The component image output from system 76, as it appears on light path 77, is represented in FIG. 5b. It is apparent in FIG. 5b, that the lines $j'k'$ and $l'm'$ appear to merge in a vanishing point VP'. In comparing FIG. 5b with FIG. 6b, it is evident that the lines which were parallel in FIGS. 5a and 6a do not have the same angular inclination toward the respective vanishing point VP and VP'. Stated another way, the perspective which is generated and appears in the FIG. 5b is not the same as the perspective which is generated and appears in FIG. 6b. In order to render the perspective the same in FIG. 5b as in FIG. 6b, the component image W'X'Y'Z' appearing on line 77, as demultiplexed onto line 81, is vertically compressed in vertical compressor 84 of FIG. 4 so as to form the component image, on light path 86, depicted in FIG. 5c.

In comparing FIG. 5b with FIG. 5c, the distances $j'l'$ and $k'm'$ equal the distances $j''l''$ and $k''m''$. What has changed is the perspective, that is, the angular inclination of the previously parallel lines with respect to the new vanishing point VP''. More particularly, that angular inclination now matches the angular inclination of the previously parallel lines of FIG. 6b. With the perspective matched in this manner, the component images of FIG. 5c and FIG. 6b appearing on light paths 86 and 85, respectively, of FIG. 4 are combined into the composite output image of FIG. 7 appearing on adjacent light paths 92 and 91, respectively, of FIG. 4.

Referring to FIG. 7, the previously parallel lines in the objects of FIG. 5a and 6a appear in FIG. 7 as two straight lines running to a common vanishing point, VP'''. More particularly, the segment A''$a'''$ is colinear with the segment $j''k''$. Similarly, the segment D''$d''$ is colinear with the segment $l''m''$. Furthermore, the segments $j''l''$ and $a''d''$ are coextensive and colinear notwithstanding the fact that they started out as different dimensions from the corresponding segments $ad$ and $jl$ in FIGS. 6a and 5a, respectively. The equality of those segments in FIG. 7 is desired in the composite output image because they represent an equal distance along the ground.

Perspective Generation Systems

The perspective generation system 76 in FIG. 4 may be one of several preferred embodiments. One embodiment, as previously indicated, can be that in the above-described application, Ser. No. 544,866. One preferred embodiment of the perspective generation system is shown in FIG. 8.

Figure 8:
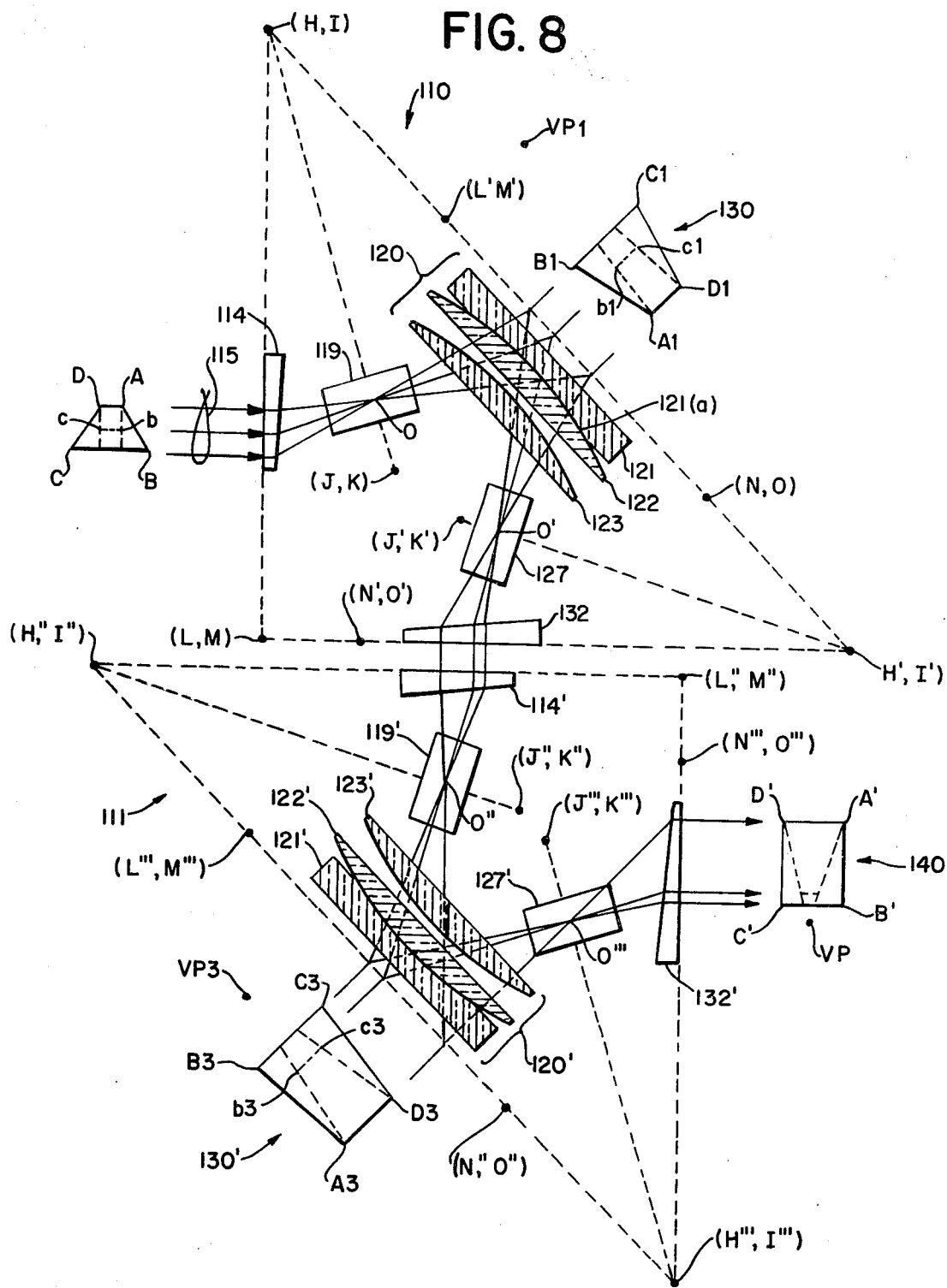
FIG. 8 depicts one preferred embodiment of a perspective generation system embodied in the apparatus of FIG. 4.

In FIG. 8, a perspectiveless object in the form of trapezoid ABCD (like those trapezoids previously identified in FIGS. 1, 2, 3, and 6) forms the input to the system. In a similar manner, an output containing perspective in the form of the rectangle A'B'C'<$^{D'}$ is formed.

In FIG. 8, a first double Scheimpflug system 110 is shown with its output serving as an input to a second double Scheimpflug system 111. The first and second double Scheimpflug systems 110 and 111 are identical. The first double Scheimpflug system 110 employs Scheimpflug principles as previously described in connection with FIG. 3. Specifically, a first Scheimpflug object plane is defined by the line between the points (HI) and (LM). The first Scheimpflug lens plane is defined by the line between the points (HI) and (JK). The first Scheimpflug image plane is defined by the line between the points (HI) and (NO). The lettering of the points and the lines defining planes in FIG. 8 are analogous to the lettering of the Scheimpflug planes in FIG. 3.

The first Scheimpflug object plane includes a conventional wedge 114 for bending the input rays 115 toward a conventional focusing lens system 119. The lens system 119 has its optical center in the first Scheimpflug lens plane defined by the line between the points (HI) and (JK). Light rays from the lens system 119 are directed into the lens system 120. Lens system 120 includes a lens element 121 with a curved mirror surface 121a for reflecting the light toward the second Scheimpflug lens system 127. The lens systems 120 further includes the nonregular toroidal elements 122 and the element 123. The effect of the lens system 120 is to capture the light from lens system 119 and to direct it into lens system 127 as if it were reflected from the Scheimpflug image plane defined by the line between points (HI) and (NO) where the trapezoidal image A,B,C,D is effectively imaged. The input light to lens system 127 is substantially nondistorted when a proper design of the lens elements 121, 122 and 123 is selected. The nonvirtual image represented by trapezoid A1B1C1D1 appears with the side B1C1, compressed relative to the side A1D1 thus indicating that some perspective has been added to the input trapezoid ABCD.

The second of the two Scheimpflug systems in the double Scheimpflug system 110 is defined by the object plane defined by the line between the points (H'I') and (L'M'). The second Scheimpflug lens plane is defined by the line between the points (H'I') and (J'K'). Note that the Scheimpflug lens system 127 has its optical center, O', in that second Scheimpflug lens plane. The second Scheimpflug image plane is defined by the lines between the points (H'I') and (N'O'). A conventional output wedge 132 appears along that second Scheimpflug image plane. While an image like the image 130 might be shown as it appears along the second Scheimpflug image plane, no image is shown for clarity in the drawing but if shown that image, of course, would show that further perspective has been generated.

The second double Scheimpflug system 111 is like the first double Scheimpflug system 110 and receives, in conventional wedge 114', the output from the wedge 132. Light from the wedge 114' passes through the third Scheimpflug lens system 119' to the lens system 120' forming the nonvirtual image 130' in the form of trapezoid A3B3C3D3. From lens system 120', light is transmitted through the fourth Scheimpflug lens system 127' to form the component image in the form of the rectangle A'B'C'D'. The parallel lines of the initial input trapezoid ABCD have perspective added in each of the four stages of the Scheimpflug system. Stated another way, the vanishing point between parallel lines in the trapezoid ABCD is at infinity. In each stage thereafter, the vanishing point appears to move closer and closer to the edge BC of the respective trapezoid. Stated another way, the vanishing point remains fixed and the ground appears to be pushed toward the vanishing point. For example, in image 130, the vanishing point VP1 is relatively far from the side B1,C1. In image 130', the vanishing point VP3 is much closer to the side B3C3 until finally in the image 140 the vanishing point VP is very close to the edge B'C'.

Strip Film Preparation Techniques

Figure 9A:
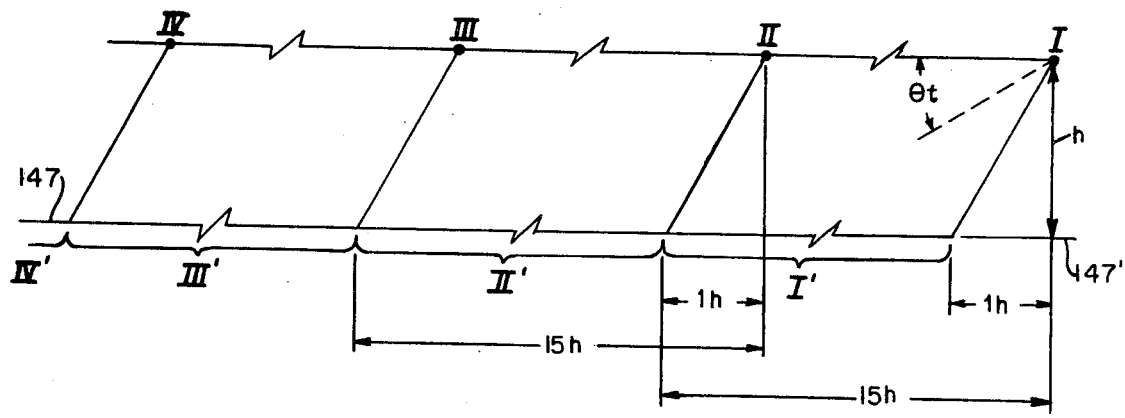
FIGS. 9a and 9b are representations useful in describing the manner of taking still photographs used in making the perspectiveless strip film employed in a preferred embodiment of the present invention.

In FIG. 9a, a representative flight path of an aircraft having a camera for taking still photographs is shown in the form of a path I, II, III, and IV. At each of the points I, II, III and IV a still photograph is taken of the ground area along line 147–147'.

The still photograph taken at each of the points I, II, III, and IV includes a picture of the area along the ground 147–147' generally represented by I' II', III', and IV'. In general, each of the areas represented by I', II', III', and IV' normally covers a distance of approximately 14 h where h is the distance of the aircraft above the ground. In actuality, considerable overlap from picture to picture is allowed in order to facilitate alignment when they are used to form a continuous strip film.

Figure 9B:
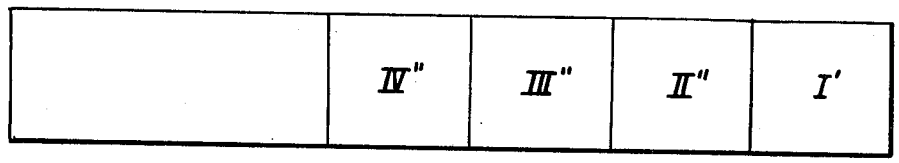

When each of the still photographs taken in accordance with the FIG. 9a procedure is laid end to end such as depicted in FIG. 9b, a continuous strip film of the ground along the line 147–147' is formed. The photographs, of course, are laid in the order of I", II", III" and IV" corresponding to the order of taking the photographs. While in FIG. 9a and FIG. 9b no overlapping of photographs has been indicated, such overlapping, of course, is usually provided.

In addition to the strip film indicated for FIGS. 9a and 9b, a second strip film (not shown) may be simultaneously formed by a second set of still photographs taken at the same points, I, II, III and IV. The second series of photographs, of course, represent distances typically from 15h to 71h. Since 15h to 71h is four times the distance from 1h to 15h, the scale of the 15h to 71h photographs is conveniently one-fourth that of the scale of the 1h to 15h photographs.

Figure 10:
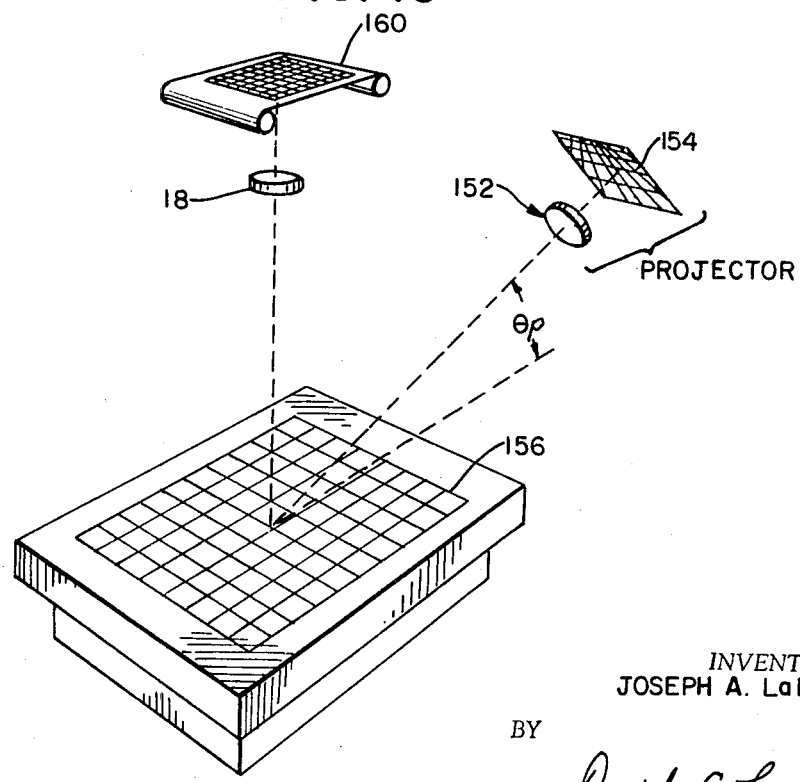
FIG. 10 illustrates one typical manner of rectifying the still photographs of FIGS. 9 in order to make a perspectiveless strip film.

The photographs obtained in accordance with the FIG. 9a and FIG. 9b procedure are not perspectivelss since they are produced with an optical system pointed at a forward oblique angle. In order to remove the perspective from the photographs, the procedure depicted in FIG. 10 is typically employed. The photograph negatives, such as represented by negative 154 in FIG. 9b, are each placed in the projector 152 and are projected upon the diffusing screen 156. The angle of projection, $\theta p$, onto the projection screen 156 is made equal to the forward oblique taking angle, $\theta t$, of the camera at each of the points I through IV of FIG. 9a. The image appearing on the screen 156 in FIG. 10 is employed to expose, through any appropriate lens system such as indicated by lens 18, a strip film negative 160 which is placed at a normal to the screen 156 and is advanced for each new negative 154. In this manner, the photographs appearing as inputs 154 are rectified forming a continuous strip film 160. The strip film 160, of course, is perspectiveless. Because the strip film 160 is developed from photographs taken at a forward oblique angle, the strip film contains objects having three-dimensional aspects even though they are perspectiveless. When those objects have perspective added thereto, in accordance with the present invention, the stimulated image has both realistic perspective without loss of realistic aspect. It has been found that to obtain this realistic aspect over the total field of view, it is possible to employ aspect which is geometrically correct only at one apparent angle down from the horizon. The aspect appears substantially correct over the full field of view, for example, when the angle of the camera axis is located between 20° and 30° below the horizon.

The forward oblique photographs are taken at an altitude to provide the best possible detail with the maximum possible lateral coverage. To increase lateral coverage, parallel runs can be made to obtain parallel strips such as the one shown in FIG. 9b. Once these strips are obtained they can be reduced in scale photographically and used to provide higher altitude filmstrips. With the use of the varifocal lenses and cross-dissolve systems previously described and illustrated in FIG. 4, a simulated flight through the range of altitudes provided by the filmstrips is achieved.

Figure 11A:
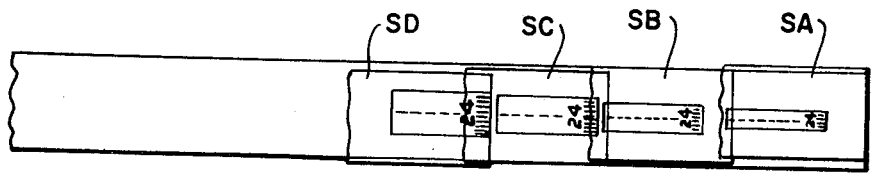
FIGS. 11a through 11c depict various views of ground objects at different scales presented on two or more film strips which may be cross-dissolved back and forth in going from one altitude to another.
Figure 11B:
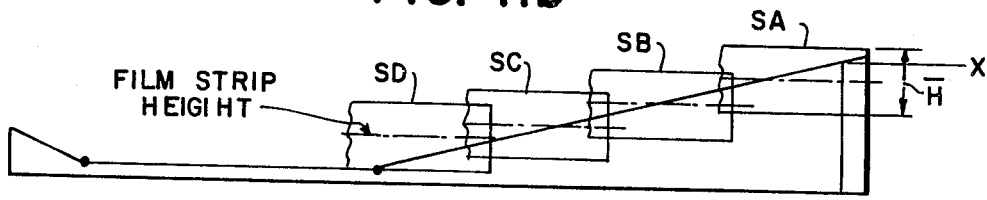
Figure 11C:
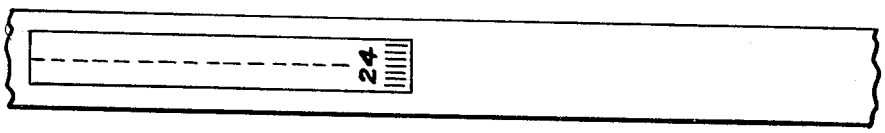

As an example, FIG. 11a illustrates a film model of approach terrain and runway wherein film strips SA, SB, SC and SD are at four different scales but cover the same essential detail on the ground. Varifocal lenses such as may be added to the system of FIG. 4 as described, are driven anywhere within their vertical altitude magnification range so that each strip in effect covers a vertical maneuvering envelope as shown in FIG. 11b. Arranged in overlap fashion by their relative scales and considering the varifocal range any flight path within the total vertical envelope can be achieved. The vertical envelope for filmstrip SA is represented by $\bar{H}$. Note that the different scales of the filmstrips are shown in FIG. 11a by the relative sizes of the runway shown in plan view in FIG. 11c. The varifocal lenses will allow the apparent runway size of the first filmstrip SA to increase in apparent scale to that of filmstrip SB and a little beyond allowing for cross-dissolve time. This crossdissolving is done successively from scale to scale in either direction, that is, going down or coming up on takeoff. In addition to the vertical envelopes illustrated in FIG. 11b analogous lateral and longitudinal envelopes exist for each filmstrip. The strip film system of the present invention, therefore, not only provides three-dimensional aspect because of the forward oblique photography but also allows complete freedom of flight within the vertical, lateral and longitudinal envelopes generated by the strip films as well as the possibility of simulating any horizontal, vertical or lateral velocity from rearward motion, as in the helicopter, to a 0 velocity hovering altitude and to any forward velocity on through hypersonic speed. This capability is due to the use of strip film where dependence upon the number of frames per second in taking the pictures and then displaying them is completely eliminated. Notably, the strip film system also permits aircraft to roll to a complete stop at any speed gradient without losing the picture and also to accelerate from a complete stop to takeoff velocity at any velocity gradient.

Figure 12:
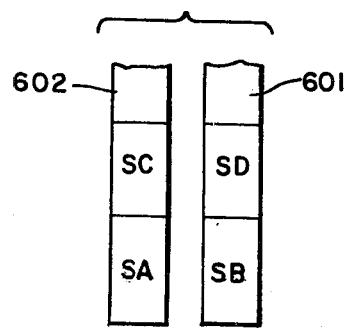
FIG. 12 depicts two typical film strips containing the objects represented in FIGS. 11a through 11c.

In FIG. 12, two filmstrips 601 and 602 are shown having the strips SB and SD and having the strips SA and SC, respectively. In simulating the flight path of FIG. 11b, the system of FIG. 4 first employs filmstrip 602 for SA, then cross-dissolves to strip 601 for SB, then 602 for SC and finally 601 for SD. While the invention has been particularly shown and described with reference to preferred embodiments thereof, it will be understood by those skilled in the art that various changes in form and details may be made therein without departing from the spirit and the scope of the invention.

What is claimed is:

1. An apparatus for simulating the appearance of a field of view comprising,
    first means containing a first object including a first partial field of view at a first scale,
    second means containing a second object of a second partial field of view at a second scale,
    third means for independently introducing perspective into the first and second partial fields of view to form a first component image and a second component image, respectively,
    fourth means for altering the perspective of said first component image to match the perspective of said second component image, and
    fifth means for combining said first and second component images to form a composite image having the desired perspective.

2. The apparatus of claim 1 wherein said first means is a substantially perspectiveless first strip film and wherein said second means is a substantially perspectiveless second strip film.

3. The apparatus of claim 1 wherein said first and second partial fields of view include a common view at different scales along a line and wherein said third means generates perspective to render said common view to the same scale in both said first and second component images.

4. The apparatus of claim 1 wherein said third means further includes,
    a Scheimpflug perspective generation system including Scheimpflug object, lens, and image planes,
    means for multiplexing said first and said second objects into said perspective generation system to form said first component image and said second component image on a multiplexed output light path, and
    means for demultiplexing said first and second component images.

5. The apparatus of claim 4 wherein said fourth means includes an anamorphic lens system for vertically compressing said first component image.

6. An apparatus for simulating the appearance of a field of view comprising,
    a first strip film containing a substantially perspectiveless first object including a first partial field of view at a first scale,
    a second strip film containing a substantially perspectiveless second object of a second partial field of view at a second scale,
    a perspective generation system for independently introducing perspective into the first and second partial fields of view including at least one set of Scheimpflug object, lens and image planes,
    a multiplexer for multiplexing said first and said second objects into said perspective generation system to form, on a multiplexed output light path, a first component image and a second component image, respectively,
    a demultiplexer for demultiplexing said first and second component images,
    an anamorphic lens system for vertically compressing said first component image to match the perspective of said second component image, and
    means for combining said first and second component images to form a composite output image having the desired perspective.

7. The apparatus of claim 6 wherein said perspective generation system includes two double Scheimpflug perspective generation systems in tandem.

8. The apparatus of claim 6 further comprising an infinity sight for viewing said composite output image.

9. The apparatus of claim 6 wherein said first and second partial fields of view include a common view at different scales along a first line and wherein said perspective generation system generates perspective to render said common view to the same scale in both said first and second component images.

10. The apparatus of claim 9 wherein,
    said first and second partial fields of view include a plurality of points on first and second imaginary pairs of spaced parallel lines, respectively, said pairs being nonparallel to said first line and each pair spaced to represent the same distance at different scales,
    said perspective generation system is effective to introduce perspective into said first and second objects so that said first pair of parallel lines appear to merge in a vanishing point and intersect at a first angle, and so that said second pair of parallel lines appear to merge in a vanishing point and intersect at a second angle, respectively, and
    said anamorphic lens system vertically compresses the first component image until said first angle substantially equals said second angle.

11. The apparatus of claim 10 wherein said first and said second strip films include three-dimensional aspect whereby said composite output image includes three-dimensional aspect.

12. The apparatus of claim 11 wherein said first partial field of view substantially covers a distance from $1h$ to $15h$ and said second partial field of view substantially covers a distance from $15h$ to $225h$ as viewed from a height $h$ above the ground.

13. An optical apparatus for simulating the appearance of a field of view comprising,
    first and second strip films containing substantially perspectiveless first and second objects, respectively, including first and second partial fields of view, respectively, at first and second scales, respectively,
    third and fourth strip films containing substantially perspectiveless third and fourth objects, respectively, including third and fourth partial fields of view, respectively, at third and fourth scales, respectively,
    a light source for selectably illuminating said first, second, third and fourth strip films,
    cross-dissolve means for directing the illumination from said source selectably between the first and second strip films and the third and fourth strip films to provide first and second input objects,
    a perspective generation system for independently introducing perspective into said first and second input objects said system including at least one set of Scheimpflug object, lens, and image planes,
    a multiplexer for multiplexing said first and second input objects into said perspective generation system along said Scheimpflug object plane to form first and second component images, respectively, along said Scheimpflug image plane,
    a demultiplexer for demultiplexing said first and second component images,
    an anamorphic lens system for vertically compressing said first component image to match the perspective of said second component image,
    means for combining said first and second component images to form a composite output image having the desired perspective.

14. The apparatus of claim 13 further comprising an infinity sight for viewing said composite output image.

15. The apparatus of claim 13 wherein said perspective generation system includes two double Scheimpflug perspective generation systems in tandem.

16. The apparatus of claim 13 further including first controllable varifocal lens means in combination with said first and second objects and including second controllable varifocal lens means in combination with said third and fourth objects whereby control of said varifocal lens means simulates changes in altitude in said composite output image.

17. The apparatus of claim 16 further including motion control means for moving said strip films so as to simulate the appearance of motion in said composite output image.

18. The apparatus of claim 17 wherein said motion control means includes means for translating said strip films to simulate translation in said composite output image.

19. The apparatus of claim 17 wherein said motion control means includes means for rotating said strip films to simulate changes in heading in said composite output image.

* * * * *